Patented Feb. 21, 1928.

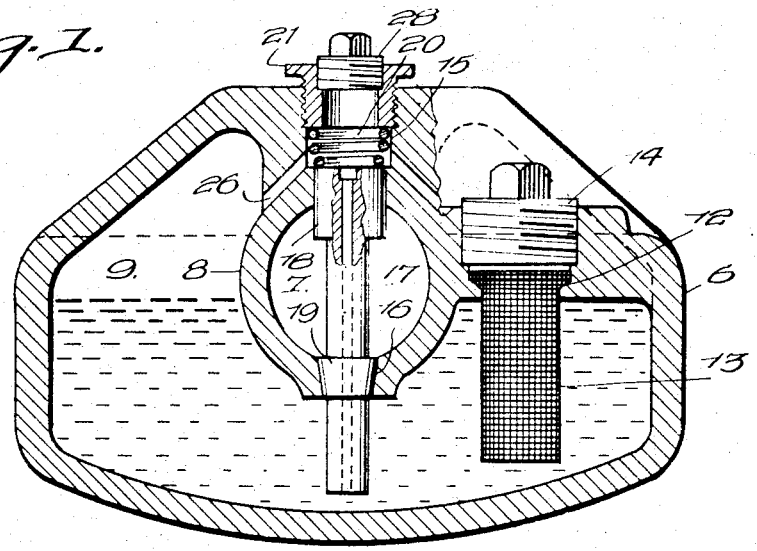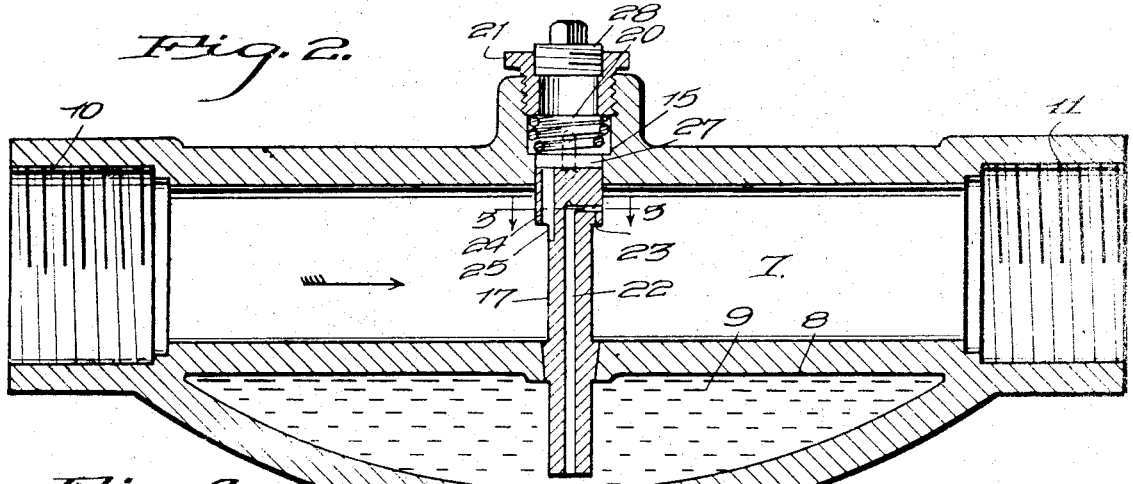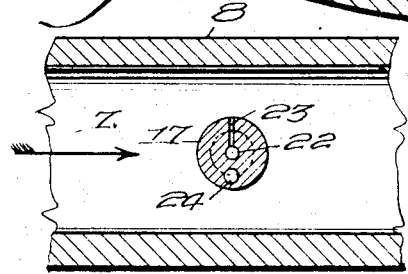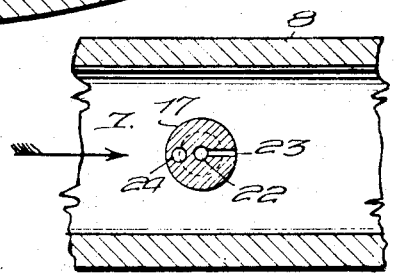

1,660,087

UNITED STATES PATENT OFFICE.

PAUL A. NELSON, OF DENVER, COLORADO, ASSIGNOR TO THE DENVER ROCK DRILL MANUFACTURING COMPANY, OF DENVER, COLORADO, A CORPORATION OF DELAWARE.

LUBRICATOR.

Application filed February 19, 1924. Serial No. 693,876.

The present invention relates to that class of lubricators employed in the supply lines or manifolds of the machines to be lubricated, as for instance, air-operated rock drills.

The primary object is to provide an apparatus of this character, which is simple and practical, and in which the amount of lubricant delivered can be varied as desired.

In the accompanying drawings:—

Figure 1 is a cross sectional view through the preferred embodiment of the invention, Figure 2 is a longitudinal sectional view therethrough, Figures 3, 4, and 5 are detail horizontal sectional views on the lines 3—3 of Figure 2, showing the different positions of the supply and controlling device.

In the embodiment shown, an outer casing 6 is employed, through which extends an open-ended passageway 7, formed by a tubular wall 8 that defines within the casing 6 and outside the passageway 7, a lubricant reservoir 9. The passageway 7 is provided at its inlet end with a coupling element 10, and at its outlet end with a coupling element 11, to which the hose sections of a fluid directing conduit may be attached. Access to the reservoir is obtained through an opening 12 formed in the outer casing wall, and a screen 13 may be supported in said opening. The opening is normally closed by a detachable closure plug 14 threaded thereinto.

The top portion of the wall 8 of the passageway 7 is preferably integral with the top of the outer casing wall, and formed therein is a chamber 15 that opens into the top of the passageway 7. The bottom of said passageway 7 in line with said chamber has a tapered opening 16. Extending across the passageway 7 is a rotatable stem 17 having an enlarged head 18 located in and filling the bottom of the chamber 15. Said stem depends into the lower portion of the lubricant reservoir 9, and has a tapered integral collar portion 19 rotatably engaged in the tapered opening 16 and having a fluid-tight joint with the walls thereof. This joint is preferably maintained by a coiled spring 20 in the chamber 15 resting on the head 18 and borne against by a tubular plug 21 threaded into the top of the chamber.

The stem 17 is provided with a longitudinal bore 22 that opens through its lower end, said lower end forming an inlet for lubricant and said bore constituting a conduit therefor. The upper end of the bore has a lateral outlet port 23 opening into the passageway 7. The upper end of the stem 17 is provided with a fluid conduit 24 terminating at its lower end in a lateral port 25 that opens into the passageway 7 and through the side of the stem opposite to the port 23. The upper end of this conduit 24 opens into the chamber 15 and from said chamber ports 26 open into the upper portion of the lubricant reservoir. The upper end of the stem 17 is formed to be engaged by a tool for rotating it. In this instance it is provided with a transverse slot 27 to receive the bit of a screw-driver, and said screw-driver can be passed through the tubular plug 21 and spring 20 so as to engage therein. Normally, however, the outer end of the plug 21 is closed by a removable plug 28 threaded into it.

Obviously the stem can be rotated so that the inlet port 25 of the fluid conduit 24 and the outlet port 23 of the lubricant conduit 22 can be located in various positions, as indicated in Figures 3, 4 and 5. When the stem is as illustrated in Figures 2 and 3, and air or other fluid under pressure is passing through the passageway in the direction indicated by the arrow, the port 25 facing the fluid stream will cause an increase in pressure through the conduit 24 and ports 26 in the upper portion of the lubricant reservoir, while a slight suction or partial vacuum will take place through the outlet port 23 of the lubricant reservoir. This will cause the lubricant to rise in the conduit 22 and flow out of the port 23 into the fluid stream. The maximum effect is gained when the stem is in the position illustrated in Figure 3. If the stem is turned at right angles, or as illustrated in Figure 4, obviously the differences in pressure is eliminated and consequently there will be practically little, if any, outflow of lubricant. The stem may furthermore be turned to any degree between these two positions, thereby varying the difference in pressure and the consequent outflow of lubricant, as indicated, for example, in Figure 5.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

What I claim is:—

1. A lubricator comprising a casing having a fluid passageway therethrough and a lubricant reservoir walled from the passageway, and means independent of the control of fluid through the passageway for directing fluid from the passageway into the reservoir and directing lubricant from the reservoir into the passageway, said means being adjustable to vary both the amount of delivery of the fluid to the reservoir and lubricant therefrom.

2. A lubricator comprising a casing having a fluid passageway therethrough and a lubricant reservoir walled from the passageway, and a common device that is independent of the control of fluid through the passageway and having means for directing fluid from the passageway into the reservoir and directing lubricant from the reservoir into the passageway, said device being movable to different positions without varying the amount of delivery of the fluid and lubricant.

3. A lubricator comprising a casing having a fluid passageway therethrough and a lubricant reservoir walled from the passageway, and a stem passing through the wall and having a lubricant conduit provided with an inlet in the reservoir and a lateral outlet opening into the passageway, said stem being rotatable to place the outlet in different relations to the fluid stream through the passageway.

4. A lubricator comprising a casing having a fluid passageway therethrough and a lubricant reservoir walled from the passageway, a stem having a rotatable fluid-tight bearing in the wall and having a lubricant conduit provided with an inlet in the reservoir and a lateral outlet opening into the passageway, said stem being rotatable to place the outlet in different relations to the fluid stream through the passageway, and means for maintaining the fluid tight bearing.

5. A lubricator comprising a casing having a fluid passageway therethrough and a lubricant reservoir walled from the passageway, and a stem passing through the wall and having a conduit for delivering fluid from the passageway into the lubricant reservoir and having a lateral inlet in the passageway, said stem being rotatable to position the inlet in different relations to the fluid stream through the passageway.

6. A lubricator comprising a casing having a fluid passageway therethrough and a lubricant reservoir walled from the passageway, a stem having a rotatable fluid tight bearing in the wall and having a conduit for delivering fluid from the passageway into the lubricant reservoir, and having a lateral inlet in the passageway, said stem being rotatable to position the inlet in different relations to the fluid stream through the passageway, and means for maintaining the fluid tight bearing.

7. A lubricator comprising a casing having a fluid passageway therethrough and a lubricant reservoir walled from the passageway, and a stem rotatably mounted in the casing and having fluid and lubricant supply conduits opening into the reservoir and respectively having a lateral inlet and a lateral outlet opening into the passageway, said stem being rotatable to place said inlet and outlet in different relations to the fluid stream through the passageway.

8. A lubricator comprising a casing having a fluid passageway therethrough and a lubricant reservoir walled from the passageway, and a stem rotatably mounted in the casing and extending across the passageway and of less diameter than the same so as to permit the passage of fluid through the passageway irrespective of its position, said stem having a lubricant conduit provided with an inlet in the reservoir and an outlet opening through one of its sides in the passageway and also having a fluid conduit with an inlet opening through one of its sides in the passageway and an outlet communicating with the reservoir, and means whereby the stem may be rotated.

9. A lubricator comprising a casing having a fluid passageway therethrough and a lubricant reservoir walled from the passageway, and a stem rotatably mounted in the casing and extending across the passageway, said stem having a lubricant conduit provided with an inlet in the reservoir and an outlet opening through one of its sides in the passageway and also having a fluid conduit with an inlet opening through one of its sides in the passageway and an outlet communicating with the reservoir, said casing having an opening giving access to one end of the stem, and said end of said stem having a tool engaging portion by which it may be turned.

10. A lubricator comprising a casing having a fluid passageway therethrough and a lubricant reservoir walled from the passageway, and a stem rotatably mounted in the casing and extending across the passageway, said stem having a lubricant conduit provided with an inlet in the reservoir and an outlet opening through one of its sides in the passageway and also having a fluid conduit with an inlet opening through one of its sides in the passageway and an outlet communicating with the reservoir, said casing having an opening giving access to one end of the stem, and said end of said stem having a tool engaging portion by which it may be turned, a detachable closure for the opening, and a spring between the closure and the end of the stem.

11. In an oiling device, a casing comprising an oil reservoir, a pressure fluid passage extending through said casing, an adjustable lubricant feeding element supported by the casing and having a passage for conducting oil from the reservoir, said element also having a second passage extending therethrough for conducting pressure fluid to the reservoir said element being provided with means for engagement by a tool to adjust the element.

12. In an oiling device, a casing comprising an oil reservoir and a main pressure fluid passage extending through said casing, an adjustable lubricant feeding stem removably supported within the casing and having a passage through it for conducting oil from the reservoir to the main passage, said stem having a second passage extending partly therethrough for conducting pressure fluid from the main passage to the reservoir, and a slot in said stem for rotating the stem in the casing.

13. In a lubricator, a casing, a wall extending through the casing, and separating the interior thereof into a fluid passageway and a lubricant reservoir, a stem within the casing rotatably mounted in the wall and extending into the passageway, said stem having a normally open lubricant passageway provided with an inlet in communication with the reservoir and an outlet opening into the passageway, and means carried by the casing for giving access to the stem to rotate the same.

14. In a lubricator, a casing, a wall extending through the casing and separating the interior thereof into a fluid passageway and a lubricant reservoir, a stem within the casing rotatably mounted in the wall and extending into the passageway, said stem having a normally open lubricant passageway provided with an inlet in communication with the reservoir and an outlet opening into the passageway, said casing having an opening in line with the stem to permit its insertion and removal and admit a tool for rotating the same, the adjacent portion of the stem being provided with means for engagement by a turning tool, and a removable closure for the opening.

15. In a lubricator, a casing, a tubular wall in the casing, forming an open ended fluid passageway and a lubricant reservoir below the same, said casing having an opening in one side, a rotatable stem having a portion journaled in the lower side of the tubular wall and having an upper end fitted to be engaged by a turning tool and accessible through the opening in the casing, a removable closure for the opening, and a lubricant passage in the stem having an outlet in the passageway and an inlet in communication with the lower portion of the reservoir.

16. In a lubricator, a passageway for fluid under pressure, an oil reservoir, and a rotatable oil controlling member having an oil conduit in open communication with the passageway and having open communication with the lower portion of the oil reservoir, said member also having a separate open conduit for fluid under pressure opening into the passageway and having open communication with the reservoir above the normal level of the oil therein.

In testimony whereof, I affix my signature.

PAUL A. NELSON.